United States Patent
Yamamoto et al.

(10) Patent No.: US 6,219,603 B1
(45) Date of Patent: Apr. 17, 2001

(54) STEERING CONTROL APPARATUS FOR VEHICLE

(75) Inventors: Takashi Yamamoto, Seto; Takahiro Kojo, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/285,690

(22) Filed: Apr. 5, 1999

(30) Foreign Application Priority Data

May 18, 1998  (JP) .................................................. 10-135540

(51) Int. Cl.$^7$ ................................ B62D 6/00; G05D 1/00; G06F 17/00
(52) U.S. Cl. .................................. 701/41; 701/51; 701/61; 180/444; 180/446; 180/68.1; 180/68.4; 318/432; 388/829; 388/831
(58) Field of Search .................................. 701/41, 51, 61, 701/42; 180/446, 68.1, 68.4, 444; 318/432; 388/831, 829

(56) References Cited

U.S. PATENT DOCUMENTS

| 5,423,391 | * | 6/1995 | Shimizu .............................. 180/79.1 |
| 5,513,720 | * | 5/1996 | Yamamoto et al. .................. 180/141 |
| 5,568,389 | * | 10/1996 | McLaughlin et al. .......... 364/424.05 |
| 5,887,671 | * | 3/1999 | Yuki et al. ........................... 180/68.1 |
| 5,913,913 | * | 6/1999 | Okanoue et al. ...................... 701/41 |
| 5,979,587 | * | 11/1999 | Liubakka et al. .................... 180/446 |
| 6,072,293 | * | 6/2000 | Shimizu et al. ..................... 318/432 |

FOREIGN PATENT DOCUMENTS

| 63-227472 | 9/1988 | (JP) . |
| 9-202252 | 8/1997 | (JP) . |

* cited by examiner

Primary Examiner—William A. Cuchlinski, Jr.
Assistant Examiner—Ronnie Mancho
(74) Attorney, Agent, or Firm—Oliff & Berridge, PLC

(57) ABSTRACT

A hand-off state determination section 73 estimates torque Th exerted on the steering handle by a driver. When the steering handle is in the hand-off state in which the torque is small, switching is effected to the side of compensator 75 having smaller gains set, so as to stabilize a steering control system.

8 Claims, 6 Drawing Sheets

STEERING CONTROL APPARATUS FOR VEHICLE

BACKGROUND OF THE INVENTION

1. Field of the Invention

The present invention relates to a steering control apparatus for vehicle provided with a transmission ratio varying mechanism for varying a transmission ratio between a steering angle of a steering handle and a turn angle of wheels by driving force of an actuator.

2. Related Background Art

There are conventionally known steering control apparatus for vehicle provided with the transmission ratio varying mechanism capable of varying the transmission ratio between the steering angle of the steering handle and the turn angle of the wheels. For example, Japanese Laid-open Patent Application No. Sho 63-227472 discloses a mechanism capable of changing the transmission ratio by such structure that a prescribed gear mechanism connects an input shaft connected to the steering handle side to an output shaft connected to the tie rod side and this gear mechanism is driven by a motor as an actuator to vary the transmission ratio of rotations between the input shaft and the output shaft. On this occasion, a rotational angle position of the motor is detected and used in feedback control, whereby control of rotational angle position of the motor is carried out so as to match the rotational angle position of the motor with a target rotational angle position.

SUMMARY OF THE INVENTION

For carrying out the control of rotational angle position of motor as described above, it is common practice to set a high control gain so as to enhance the accuracy of position control. In a hand-off state where the driver keeps the hands off the steering handle, however, the steering handle side does not catch reaction of the driving force generated by the motor of the transmission ratio varying mechanism; in that state, the feedback control system becomes unstable and the steering handle might vibrate in the circumferential direction in certain cases.

The present invention has been accomplished in order to solve this problem and an object thereof is to provide a steering control apparatus for vehicle that can adequately suppress the circumferential vibration of the steering handle even in the hand-off state where the driver keeps the hands off the steering handle.

A steering control apparatus for vehicle is a steering control apparatus for vehicle comprising a transmission ratio varying mechanism for varying a transmission ratio between a steering angle of a steering handle and a turn angle of a wheel by driving force of an actuator, the steering control apparatus comprising: steering angle detecting means for detecting the steering angle of the steering handle; turn angle detecting means for detecting the turn angle of the wheel; target turn angle setting means for setting a target turn angle of the wheel according to the steering angle, based on a transmission ratio set according to a running condition of a vehicle; first control means for controlling a torque produced by the actuator, according to a deviation between the target turn angle and the turn angle detected by the turn angle detecting means; and second control means for controlling the magnitude of the torque produced by the actuator with respect to the deviation to a smaller value than that by the first control means when it is determined that the steering handle is in a handoff state.

In the normal steering state where the driver firmly grips the steering handle, the torque produced by the actuator is controlled according to the deviation under control of the first control means, whereupon the position control of the actuator is carried out with high accuracy, for example, by setting a high control gain.

On the other hand, in the hand-off state in which the driver keeps the hands off the steering handle or in which the force exerted on the steering handle is too small to stop the circumferential vibration of the steering handle, the second control means controls the magnitude of the torque produced by the actuator against the deviation to a smaller value than that by the first control means, thereby suppressing the circumferential vibration of the steering handle in the hand-off state.

In the steering control apparatus for vehicle, the second control means is adapted to estimate a force exerted on the steering handle by a driver, based on the torque produced by the actuator and the steering angle, and to determine whether the steering handle is in the hand-off state, based on the magnitude of the force thus estimated.

This configuration permits the force exerted on the steering handle by the driver to be estimated from the relation between the torque produced by the actuator and the steering angle of the steering handle which catches the reaction of this torque produced. The second control means determines that the steering handle is in the hand-off state where the steering handle can vibrate in the circumferential direction, for example, when the force thus estimated is smaller than a predetermined criterion for determination.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Embodiments of the present invention will be described with reference to the accompanying drawings.

Figure 1:
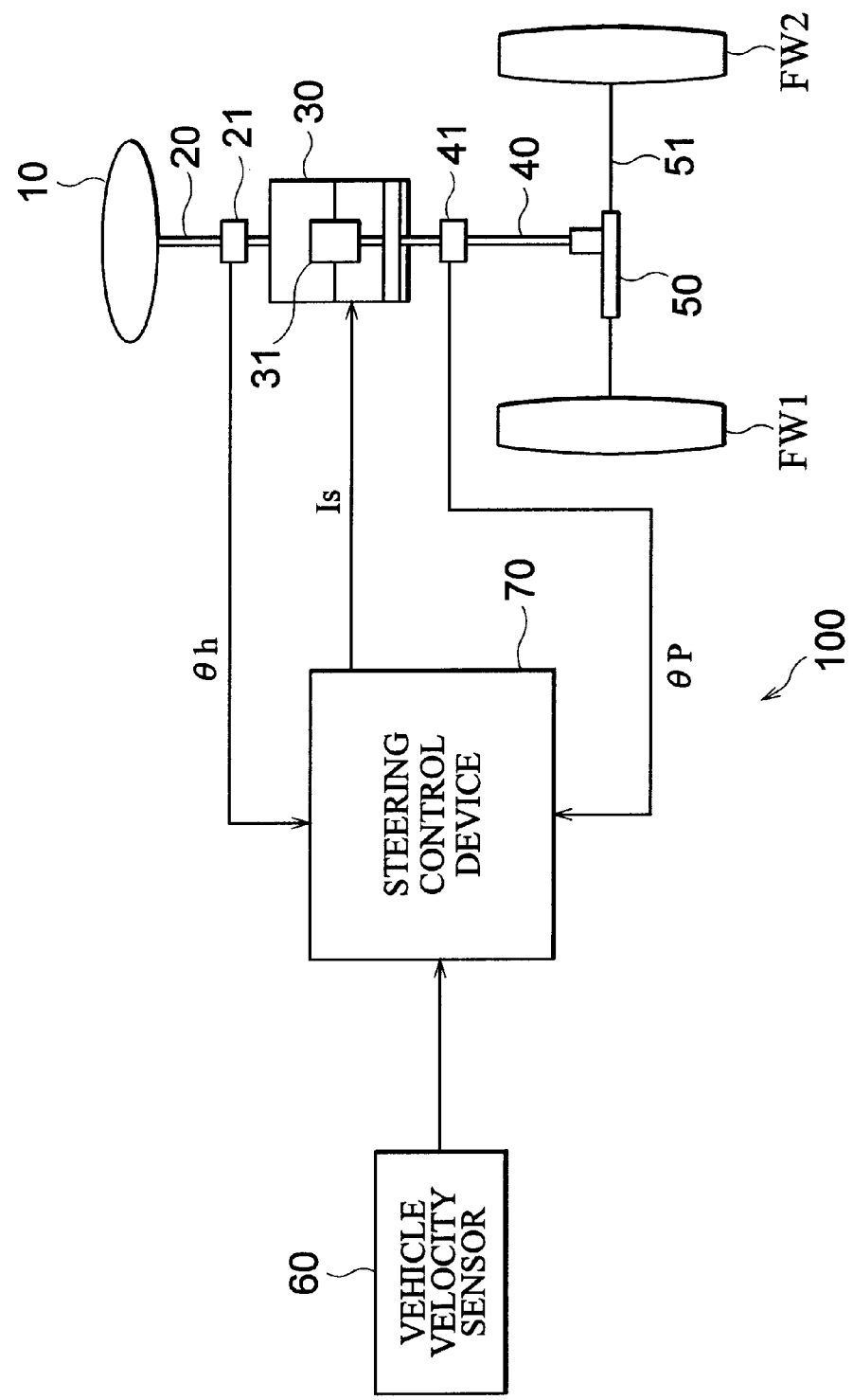
FIG. 1 is a block diagram to schematically show the structure of the steering apparatus according to an embodiment of the invention.

FIG. 1 shows the structure of steering apparatus 100 according to an embodiment.

An input shaft 20 is connected to an output shaft 40 through a transmission ratio varying mechanism 30 and a steering handle (steering wheel) 10 is connected to the input shaft 20. The output shaft 40 is connected through a gear system 50 of the rack-and-pinion type to a rack shaft 51 and wheels FW1, FW2 are connected to the both ends of the rack shaft 51.

The input shaft 20 is equipped with an input angle sensor 21 for detecting a steering angle of the steering handle 10, and the output shaft 40 with an output angle sensor 41 for detecting a rotational angle of the output shaft 40. This rotational angle of the output shaft 40 corresponds to a stroke position of the rack shaft 51, and the stroke position of the rack shaft 51 to a turn angle of the wheels FW1, FW2. Thus, the turn angle of the wheels FW1, FW2 is detected by detecting the rotational angle of the output shaft 40 by the output angle sensor 41.

The transmission ratio varying mechanism 30 is provided with a gear mechanism for connecting the input shaft 20 to the output shaft 40 and has a function to vary a transmission ratio between the steering angle of the steering handle 10 and the turn angle of the wheels FW1, FW2 by driving the gear mechanism by a motor (for example, a dc motor) 31 as an actuator. A current sensor 32 is provided to detect load current Ir flowing in the motor 31.

Control of driving of the transmission ratio varying mechanism 30 is executed by steering control device 70, which carries out control of driving of the motor 31, based on detection signals from the input angle sensor 21 provided for the input shaft 20, from the output angle sensor 41 provided for the output shaft 40, and from a vehicle speed sensor 60 for detecting the velocity of the vehicle.

Figure 2:
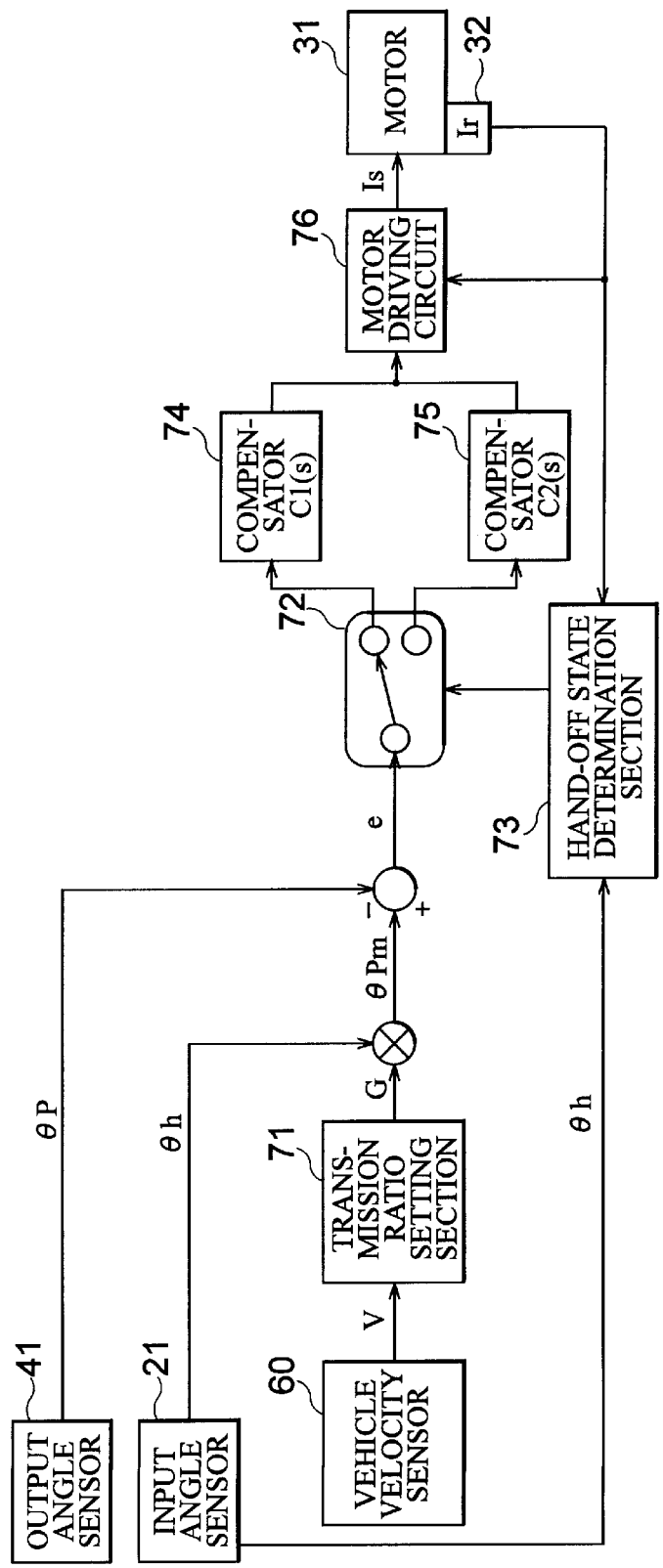
FIG. 2 is a block diagram to show the structure of the steering control device in FIG. 1.

FIG. 2 shows the structure of the steering control device 70.

The steering control device 70 is mainly composed of a transmission ratio setting section 71, a switch section 72, a hand-off state determination section 73, compensators 74, 75, and a motor driving circuit 76.

The transmission ratio setting section 71 includes a two-dimensional map for defining the relation between the vehicle velocity V and the transmission ratio G, and the transmission ratio G according to the velocity V is set by searching the map, based on a value of the velocity V detected by the speed sensor 60.

An output angle target value θpm to be a target rotational angle of the output shaft 40 is set by computing θpm=G·θh, based on the transmission ratio G set in the transmission ratio setting section 71 and the input angle θh detected by the input angle sensor 21. Then the switch section 72 receives supply of deviation e between the output angle target value θpm thus set and the output angle θp detected by the output angle sensor 41.

The switch section 72 has a function to switch a destination of the deviation e received between the compensators 74, 75, based on a determination result of the hand-off state determination section 73. A determination process of the hand-off state determination section 73 will be described hereinafter.

Figure 3:
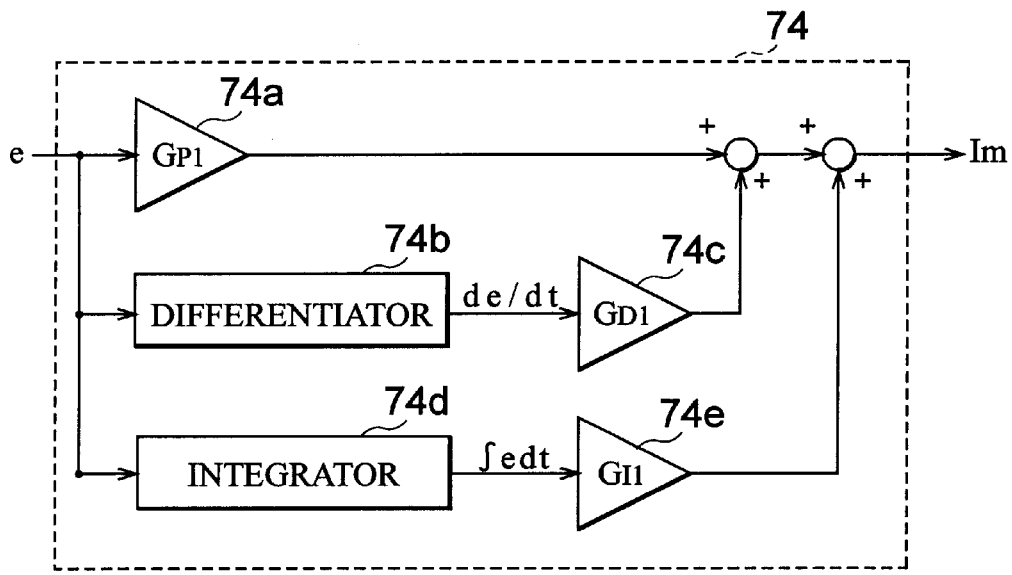
FIG. 3 is a block diagram to show the structure of the compensator used in the case of the non-hand-off state.
Figure 4:
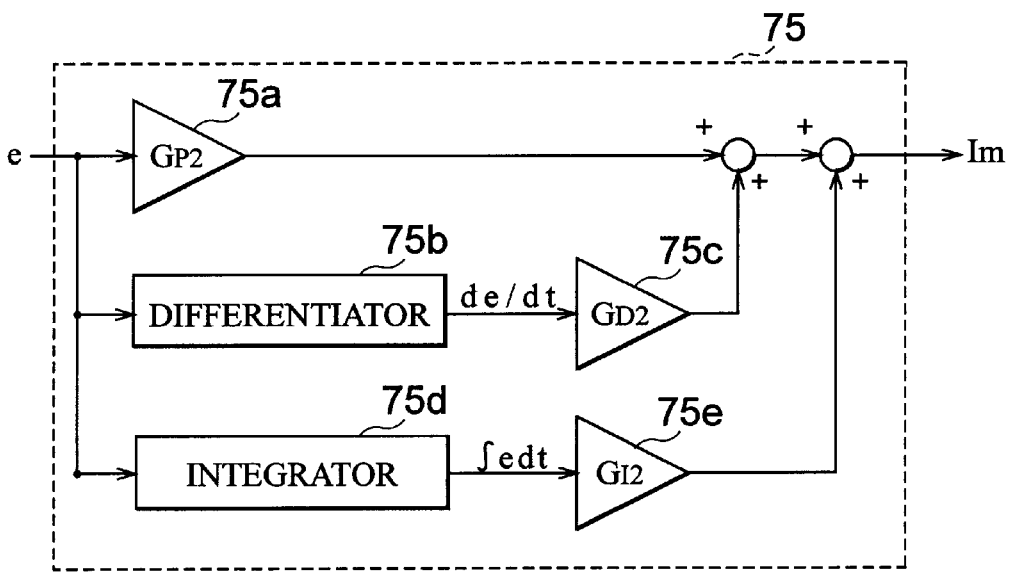
FIG. 4 is a block diagram to show the structure of the compensator used in the case of the hand-off state.

The structure of the compensator 74 is illustrated in FIG. 3 and the structure of the compensator 75 in FIG. 4.

Each of the compensators 74, 75 is provided with a proportional gain 74a, 75a, a differentiator 74b, 75b, a differential gain 74c, 75c, an integrator 74d, 75d, and an integral gain 74e, 75e, and a target current value Im supplied to the motor 31 is determined based on Eq. (1) below in the compensator 74 or based on Eq. (2) below in the compensator 75.

$$Im=G_{P1}·e+G_{D1}·(de/dt)+G_{I1}·\int edt \quad (1)$$

$$Im=G_{P2}·e+G_{D2}·(de/dt)+G_{I2}\int edt \quad (2)$$

In Eqs. (1) and (2), $G_{P1}$, $G_{P2}$ are the proportional gains, $G_{D1}$, $G_{D2}$ are the differential gains, and $G_{I1}$, $G_{I2}$ are the integral gains, wherein the values of the respective gains are set as $G_{P1}>G_{P2}$, $G_{D1}>G_{D2}$ and $G_{I1}>G_{I2}$. In the compensator 74 the gains of proportion, differentiation, and integration are set high in order to carry out the angle position control of the motor 31 with high accuracy, whereas the gains of proportion, differentiation, and integration are set smaller in the compensator 75 than in the compensator 74.

The target current value Im outputted from the compensator 74 or from the compensator 75 is supplied to the motor driving circuit 76. The motor driving circuit 76 carries out the control of driving of the motor by supplying to the motor 31 such a control signal Is that the load current Ir detected by the current sensor 32 becomes closer to the target current value Im.

Now, let us explain the determination process executed in the hand-off state determination section 73.

The hand-off state determination section 73 first estimates the magnitude of the torque exerted on the steering handle 10 by the driver (operator).

Let Ih be the inertia of the steering handle 10, Ch be a value obtained by reducing frictional force exerted in the direction of rotation on the input shaft 20 to a coefficient of viscosity, Th be the torque exerted on the steering handle 10 by the driver, Ir be the load current of the motor 31, Km be a torque constant of the motor 31, and Gm be the transmission ratio set in the transmission ratio varying mechanism 30. Then an equation of motion in the direction of rotation for the steering handle 10 can be expressed by the following equation.

$$Ih·(d^2θh/dt^2)+Ch·(dθh/dt)=Th-Km·Gm·Ir \quad (3)$$

Hence, the torque Th exerted on the steering handle 10 by the driver can be estimated by the following equation derived from Eq. (3).

$$Th=Ih·(d^2θh/dt^2)+Ch·(dθh/dt)+Km·Gm·Ir \quad (4)$$

From Eq. (4), in which the inertia Ih, coefficient of viscosity Ch, torque constant Km, and transmission ratio Gm are known or set by internal processing, the torque Th exerted on the steering handle 10 by the driver can be estimated by detecting the input angle θh of the steering handle 10 and the load current Ir of the motor 31. In this way the h and-off state determination section 73 estimates the magnitude of the torque Th according to Eq. (4), based on the input angle θh and the load current Ir detected.

Then the magnitude of the torque Th estimated is compared with a predetermined threshold ε1. This threshold ε1 is a value preliminarily specified as a value of the torque Th at or below which the force exerted on the steering handle 10 is too small to stop the circumferential vibration of the steering handle 10. Thus the torque Th estimated is compared with the predetermined threshold ε1; in the case of $|Th|≦ε1$, it is determined that the steering handle is in the hand-off state similar to the state wherein the driver keeps the hands off the steering handle 10; in the case of $|Th|>\epsilon 1$, it is determined that the steering handle is in the normal steering state where in the driver firmly grips the steering handle 10.

This determination result is given to the switch section 72. When the hand-off state determination section 73 determines that the steering handle is not in the hand-off state, the output is switched to the side of compensator 74; when it is determined that the steering handle is in the hand-off state, the output is switched to the side of compensator 75.

When the steering handle is not in the hand-off state but in the normal steering state, the control of angular position of the motor 31 can be carried out with high accuracy by use of the compensator 74 with the higher gains accordingly. On the other hand, in the case of the hand-off state, the accuracy of the control of the angular position of motor 31 is lowered by use of the compensator 75 with the smaller gains, whereby the steering control system is prevented from becoming unstable and whereby the phenomenon of the circumferential vibration of the steering handle 10 can be suppressed adequately.

The hand-off state determination section 73 is adapted to determine whether the steering handle is in the hand-off state, based on the magnitude of the estimated torque $|Th|$, but another example can also be so arranged that conditions for determination of the hand-off state may further include a situation in which a change rate of the output angle $\theta p$, $d\theta p/dt$, is within a predetermined small range around zero (which is a state in which substantially no steering is carried out), a situation of low vehicle velocities V, etc. and that determination of the hand-off state is made when all the conditions are met.

Another embodiment will be described below.

Figure 5:
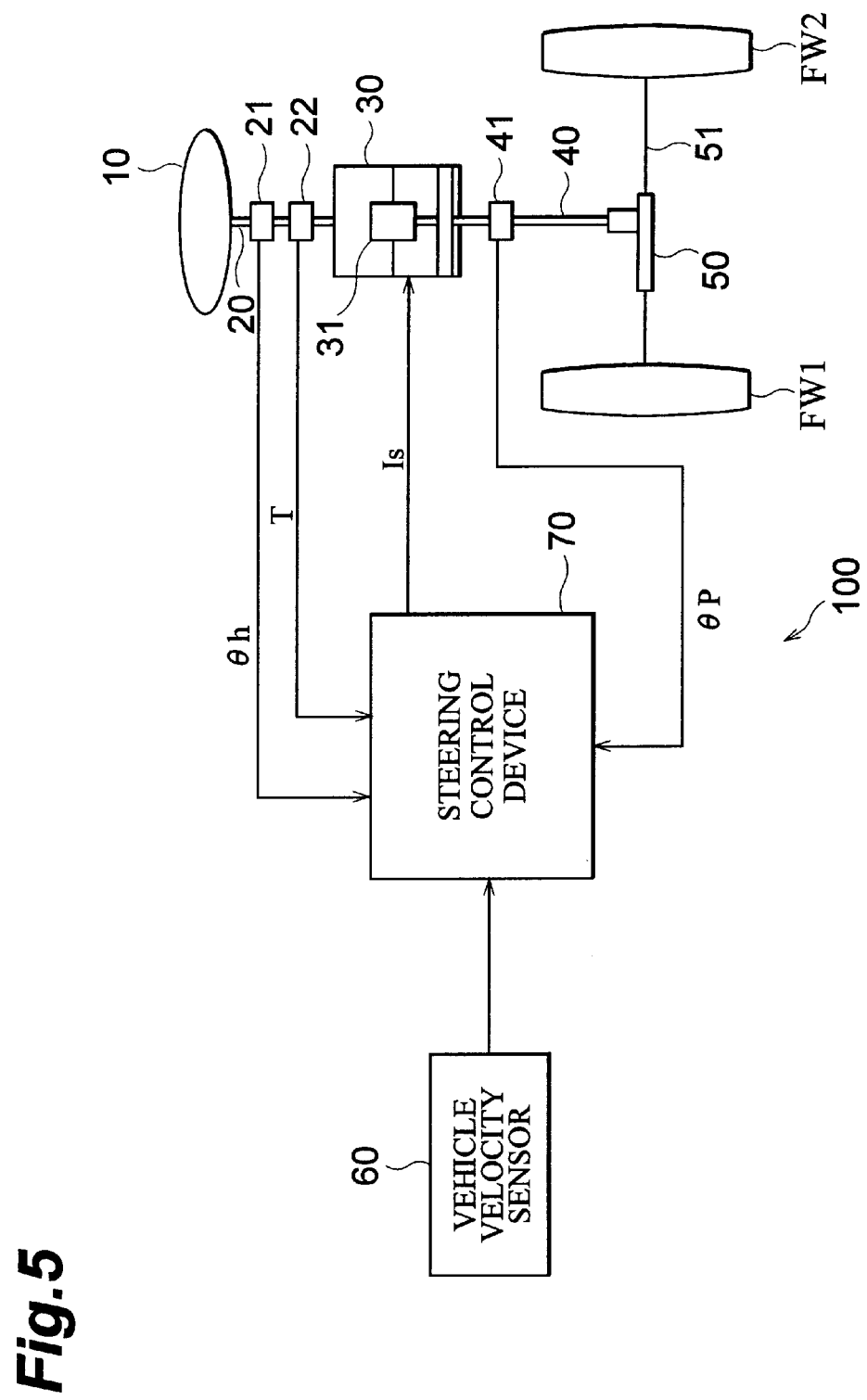
FIG. 5 is a block diagram to schematically show the structure of the steering apparatus according to another embodiment of the invention.

The structure of steering apparatus 110 according to another embodiment is illustrated in FIG. 5. This steering apparatus 110 is provided with a torque sensor 22 for detecting force exerted in the twist direction on the input shaft 20, in place of the current sensor 32 shown in FIG. 1. The torque Th exerted on the steering handle 10 by the driver is estimated using a torque sensor value T which is a detection result of the torque sensor 22.

Figure 6:
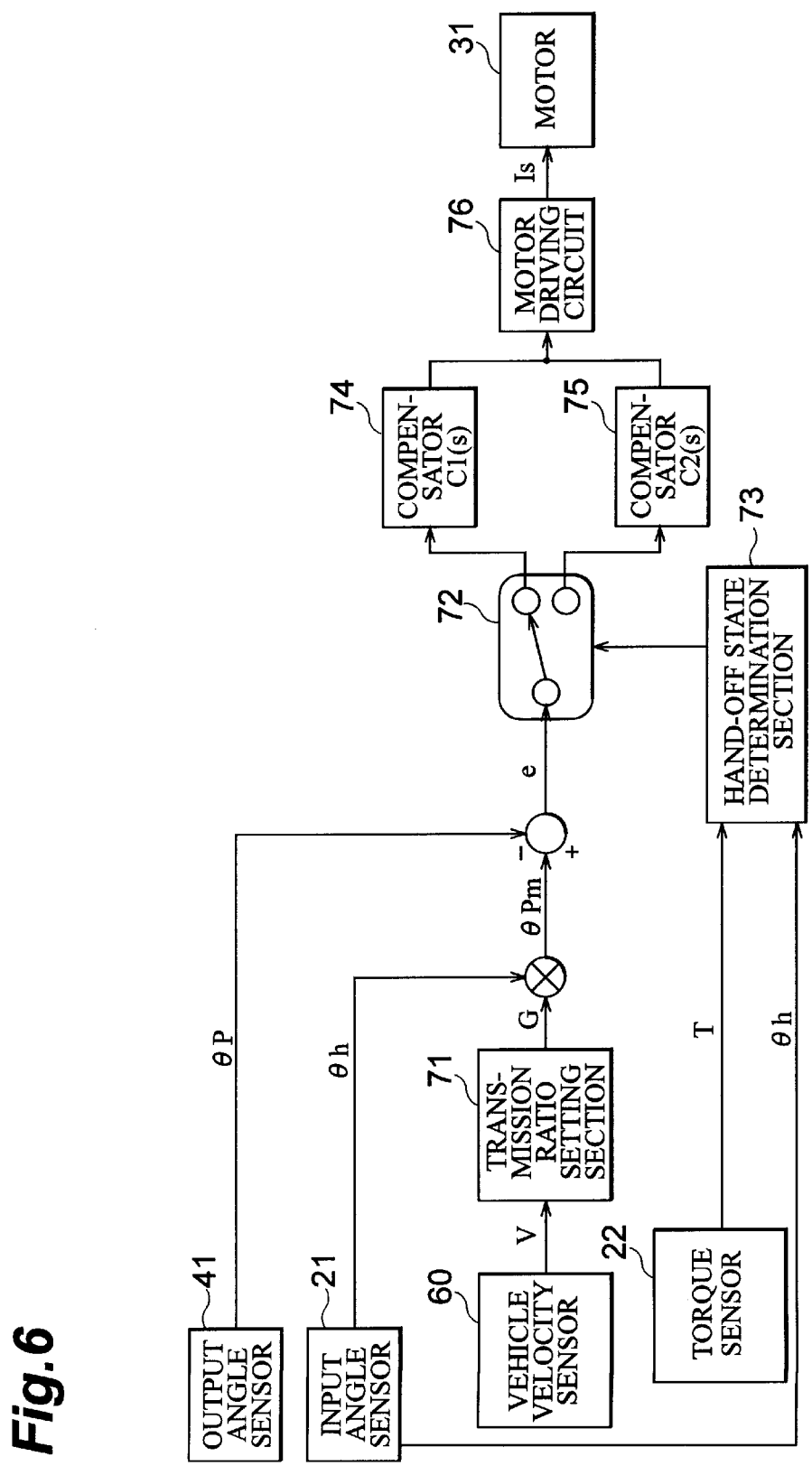
FIG. 6 is a block diagram to show the structure of the steering control device in FIG. 5.

Therefore, as illustrated in FIG. 6, the hand-off state determination section 73 forming the steering control device 70 receives supply of the input angle Oh detected by the input angle sensor 21 and the torque sensor value T detected by the torque sensor 22.

Using the torque sensor value T detected by the torque sensor 22 instead of the load current Ir of the motor 31, an equation of motion in the direction of rotation for the steering handle 10 can be expressed by the following equation.

$$Ih\cdot(d^2\theta h/dt^2)+Ch\cdot(d\theta h/dt)=Th-T \quad (5)$$

Hence, the torque Th exerted on the steering handle 10 by the driver can be estimated by the following equation derived from Eq. (5)

$$Th=Ih\cdot(d^2\theta h/dt^2)+Ch\cdot(d\theta h/dt)+T \quad (6)$$

From Eq. (6) wherein the inertia Ih and coefficient of viscosity Ch are known or set by internal processing, the torque Th exerted on the steering handle 10 by the driver can be estimated by obtaining the input angle $\theta h$ of the steering handle 10 and the torque sensor value T as a detection result of the torque sensor 22. In this way the hand-off state determination section 73 estimates the magnitude of the torque Th according to Eq. (6), based on the input angle $\theta h$ and the torque sensor value T detected.

Then, in the same manner as in the embodiment stated previously, the estimated torque Th is compared with the predetermined threshold $\epsilon 1$; in the case of $|Th|\leq\epsilon 1$, the determination is the hand-off state similar to the situation in which the driver keeps the hands off the steering handle 10; in the case of $|Th|>\epsilon 1$, the determination is the normal steering state in which the driver firmly grips the steering handle 10.

The switch section 72 switches the output to either of the compensator 74 and the compensator 75, based on this determination result. Since the structure of the compensators 74, 75 and the switching operation of the switch section 72 are the same as in the embodiment stated previously, the description thereof is omitted herein.

As described above, the torque Th exerted on the steering handle 10 by the driver can also be estimated by using the torque sensor value T detected by the torque sensor 22, in place of the load current Ir of the motor 31.

In each embodiment described above, the values of the respective gains of the compensators 74, 75 were exemplified as $G_{P1}>G_{P2}$, $G_{D1}>G_{D2}$, and $G_{I1}>G_{I2}$, but the invention is by no means limited to this relation of magnitude. There are no specific restrictions on the relation of magnitude as long as the magnitude of the torque produced by the motor 31 with respect to the deviation e can be reduced by switching from the compensator 74 to the compensator 75.

In another embodiment, the apparatus can also be constructed so as to prevent abrupt change of gains by gradually changing the values of the respective gains on the occasion of switching from the compensator 74 to the compensator 75 or from the compensator 75 to the compensator 74.

Figure 7:
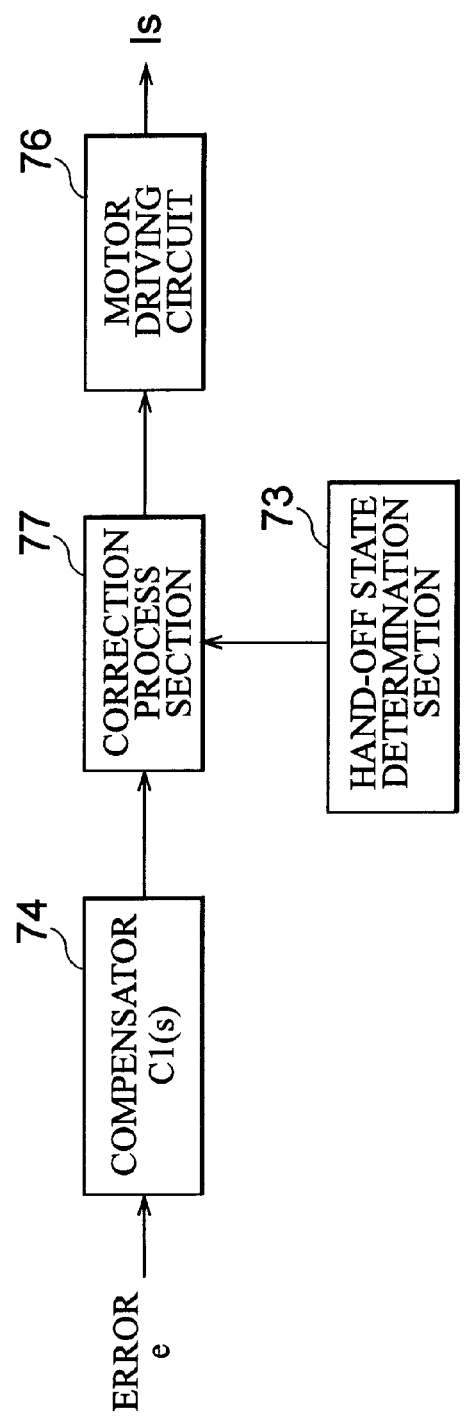
FIG. 7 is a block diagram to show the structure of another steering control device of the invention.

Further, the above exemplified the switching between the compensators 74, 75 by the switch section 72, but, without having to be limited to this example, the apparatus can also be constructed in such structure that only the compensator 74 is provided, for example, as illustrated in FIG. 7 and that the output of the compensator 74 is supplied through a correction process section 77 to the motor driving circuit 76. In this case, when the hand-off state determination section 73 makes the determination of the hand-off state, the correction process section 77 corrects the gain of the target current value Im outputted from the compensator 74 to a smaller value and supplies the result to the motor driving circuit 76.

When this correction process is carried out, the correction amount can also be changed according to the magnitude of the torque Th, for example, in such a manner that the gain is decreased more with decreasing torque Th estimated by the hand-off state determination section 73.

As stated above, the steering control apparatus for a vehicle comprises: (A) a transmission ratio varying mechanism 30 capable of varying the amount of angular rotation of an output shaft 40 relative to the amount of angular rotation of an input shaft 20 connected to a steering handle 10, the mechanism 30 including an actuator 31 for driving the mechanism 30; and (B) a steering control device 70 that controls the transmission ratio G by driving the actuator 31, the device 70 controlling the torque of the actuator 31 based on a force F applied to the steering handle 10. Force F is determined based on current Is.

The device 70 sets the amount of torque supplied when the force F is less than a predetermined value to an amount that is less than the amount of torque supplied when the force is larger than the predetermined value.

The device 70 determines the steering handle 10 is no longer under manual control (hand-off state) when the force is less than the predetermined value.

The predetermined transmission ratio is determined using data on the vehicle's operational condition.

The operational condition is defined based on signals from a vehicle velocity sensor 60.

The steering control apparatus for vehicle comprising a transmission ratio varying mechanism for varying a transmission ratio between a steering angle of a steering handle and a turn angle of a wheel by driving force of an actuator, the steering control apparatus comprises: steering angle detecting means for detecting the steering angle of the steering handle; turn angle detecting means for detecting the turn angle of the wheel; target turn angle setting means for setting a target turn angle of the wheel according to the steering angle, based on a transmission ratio set according to a running condition of a vehicle; first control means for controlling a torque produced by the actuator, according to a deviation between the target turn angle and the turn angle detected by the turn angle detecting means; and second control means for controlling the magnitude of the torque produced by the actuator with respect to the deviation to a smaller value than that by the first control means when it is determined that an operator keeps the hands off the steering handle.

The second control means is adapted to estimate a force exerted on the steering handle by a driver, based on the torque produced by the actuator and the steering angle, and to determine whether the steering handle is in the hand-off state, based on the magnitude of the force thus estimated.

As detailed above, the steering control apparatus for vehicle adopts the configuration comprising the first control means for controlling the torque produced by the actuator according to the deviation, and the second control means for controlling the magnitude of the torque produced by the actuator with respect to the deviation to a smaller value than that by the first control means when the determination of the hand-off state is made. This achieves such control as to make the torque produced by the actuator smaller in the situation of the hand-off state in which the driver keeps the hands off the steering handle or in which the force exerted on the steering handle is too small to stop the circumferential vibration of the steering handle. This can adequately suppress occurrence of the circumferential vibration of the steering handle.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A steering control apparatus for a vehicle, comprising:

(A) a transmission ratio varying mechanism capable of varying the amount of angular rotation of an output shaft relative to the amount of angular rotation of an input shaft connected to a steering handle, said mechanism including an actuator for driving said mechanism by applying a torque thereto; and (B) a steering control device that controls transmission ratio by driving said actuator, said device determining a force applied to said steering handle and controlling the torque of said actuator based on the force applied to said steering handle.

2. An apparatus according to claim 1, further including an apparatus to determine a predetermined transmission ratio using data on the vehicle's operational condition.

3. An apparatus according to claim 2, wherein said operational condition is defined based on signals from a vehicle velocity sensor.

4. The steering control apparatus of claim 1, wherein the torque is applied until a rotational angle of said output shaft reaches a target value.

5. A steering control apparatus for a vehicle comprising:

(A) a transmission ratio varying mechanism capable of varying the amount of angular rotation of an output shaft relative to the amount of angular rotation of an input shaft connected to a steering handle, said mechanism including an actuator for driving said mechanism by applying a torque thereto; and (B) a steering control device that controls transmission ratio by driving said actuator, said device controlling the torque of said actuator based on a force applied to said steering handle;

wherein said device sets the amount of torque supplied when said force is less than a predetermined value to an amount that is less than the amount of torque supplied when said force is larger than said predetermined value.

6. An apparatus according to claim 5, wherein said device determines said steering handle is no longer under manual control when said force is less than said predetermined value.

7. A steering control apparatus for vehicle comprising a transmission ratio varying mechanism for varying a transmission ratio between a steering angle of a steering handle and a turn angle of a wheel by driving force of an actuator, said steering control apparatus comprising:

steering angle detecting means for detecting the steering angle of the steering handle;

turn angle detecting means for detecting the turn angle of the wheel;

target turn angle setting means for setting a target turn angle of the wheel according to the steering angle, based on a transmission ratio set according to a running condition of a vehicle;

first control means for controlling a torque produced by said actuator, according to a deviation between said target turn angle and the turn angle detected by said turn angle detecting means; and second control means for controlling the magnitude of the torque produced by said actuator with respect to said deviation to a smaller value than that by said first control means when it is determined that an operator keeps the hands off said steering handle.

8. The steering control apparatus for vehicle according to claim 7, wherein said second control means is adapted to estimate a force exerted on the steering handle by a driver, based on the torque produced by said actuator and the steering angle, and to determine whether the steering handle is in said hand-off state, based on the magnitude of the force thus estimated.

* * * * *